(12) United States Patent
Bhat

(10) Patent No.: US 11,617,153 B1
(45) Date of Patent: Mar. 28, 2023

(54) GEOLOCATION PREDICTION FOR USER EQUIPMENT OF A COMMUNICATION NETWORK

(71) Applicant: NetScout Systems Texas, LLC, Plano, TX (US)

(72) Inventor: Sunil Bhat, Plano, TX (US)

(73) Assignee: NetScout Systems Texas, LLC, Plano, TX (US)

( * ) Notice: Subject to any disclaimer, the term of this patent is extended or adjusted under 35 U.S.C. 154(b) by 42 days.

(21) Appl. No.: 17/470,864

(22) Filed: Sep. 9, 2021

(51) Int. Cl.
*H04W 64/00* (2009.01)

(52) U.S. Cl.
CPC .................. *H04W 64/006* (2013.01)

(58) Field of Classification Search
CPC ....... H04W 64/00; H04W 4/029; H04W 4/02; H04W 4/024; H04W 4/025; H04W 4/24; H04M 15/44; H04M 2203/4536; H04M 2215/0176; H04M 2215/0188; H04M 3/2218; H04M 3/42059; H04M 3/523; H04M 3/533; H04M 2203/551; H04M 2203/556; H04M 2203/558; H04M 3/2281; H04M 3/51; H04M 3/5175; H04M 15/41; H04M 15/43; H04M 15/705; H04M 15/8033; H04M 17/10; H04M 17/106; H04M 7/006; H04M 3/42; H04M 2207/18; H04M 3/42323

See application file for complete search history.

(56) References Cited

U.S. PATENT DOCUMENTS

| 2013/0040649 A1* | 2/2013 | Soto Matamala .... H04W 64/00 455/456.1 |
| 2016/0021637 A1* | 1/2016 | Cao ................... H04W 36/0094 455/440 |

* cited by examiner

*Primary Examiner* — Kwasi Karikari
(74) *Attorney, Agent, or Firm* — Locke Lord LLP; Scott D. Wofsy; Christopher J. Capelli

(57) ABSTRACT

A method includes receiving call records from a control plane, each call record including a cell list identifying the server cell for the UE call session at the time the call record was generated and an ordered set of neighbor cells, ordered based on a characteristic of signals from the neighbor cells. Call records having truth data are selected, wherein the truth data includes geolocation (GL) data reported to be a GL associated with the call record. GL data of the selected call records is stored in association with the cell list for the selected call records. A centroid is determined as a function of the GL data associated with each of the selected call records that includes the associated cell list. The centroids are stored in association with the corresponding cell list, and can be retrieved as a prediction for a GL based on submission of a cell list.

20 Claims, 8 Drawing Sheets

GEOLOCATION PREDICTION FOR USER EQUIPMENT OF A COMMUNICATION NETWORK

FIELD OF THE INVENTION

The present technology relates to building and employing a system to estimate or predict geolocation of radio access network (RAN) user equipment (UE) and, more particularly, building and employing a machine learning (ML) system to predict geolocation of RAN UE.

BACKGROUND OF THE INVENTION

Determination of geolocation of user equipment (UE) when communicating using a cellular communication system can be based on key parameters and statistical calculations using measurement parameters, such as Reference Signal Received Power (RSRP), Reference Signal Received Quality (RSRQ), Timing Advance (TA) and others. These calculations can consume a large quantity of resources. Furthermore, geolocation can be requested for each Radio Resource Control (RRC) call setup, including establishment of a call as well as handovers.

In a dense urban location there can be a greater density of cells in order to provide service in an environment with buildings that cause obstructions, each cell having a cell phone tower directed at a selected angle for providing complete coverage. In addition, there is a greater density of UEs, including UEs that are being relocated. Accordingly, the number of geolocation requests increases in a dense urban location due to the higher density of cells, higher density of UEs, and increased amount of handovers.

Over time, the obstructions can change, surrounding change or location of cells changes.

A method for predicting geolocation (GL) of user equipment (UE) when communicating via a cellular communication system is disclosed in co-pending applications having Patent Application Serial Nos. 17401059 and 17401070, both filed Aug. 12, 2021 and assigned to NetScout Systems Texas, each of which is incorporated herein by reference in its entirety.

While such conventional methods and systems for determining geolocation have generally been considered satisfactory for their intended purpose, there is still a need in the art for methods and systems to predict geolocation with one or more levels of accuracy. The present disclosure provides a solution.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method that includes receiving call records from a control plane in association with user equipment (UE) call sessions for communication by user equipment via a radio access network (RAN). Each call record includes a cell list, wherein the cell list identifies the server cell for the UE call session at the time the call record was generated and an ordered set of neighbor cells that are ordered based on a characteristic of signals from the neighbor cells. Call records that include truth data are selected from the call records received, wherein the truth data includes geolocation (GL) data reported to be a GL associated with the call record. GL data of the selected call records is stored in association with the cell list for the selected call records. A centroid is determined for each cell list, wherein the centroid is calculated as a function of the GL data associated with each of the selected call records that includes the cell list. The centroid for each cell list is stored in association with the cell list, wherein the centroid is retrievable as a prediction for a GL based on a submission of a cell list.

In one or more embodiments, the method can further include receiving a query for a GL prediction, wherein the query includes a cell list, determining a GL prediction based on the centroid stored in association with the cell list, and responding to the query with the GL prediction.

In one or more embodiments, the method can further include updating the GL data stored in association with the cell list over time based on newly selected call records selected from newly received call records that include truth data.

In one or more embodiments, the selected call records can further include signal detail data reported to be a characteristic of signals associated with communication by the UE when the corresponding call record was generated. The method can further include building a machine learning (ML) model based on the selected call records and the corresponding cell list, signal detail data, and truth data.

In one or more embodiments, building the ML model can further include, for each cell list, further building the ML model based on the centroid associated with the cell list.

In one or more embodiments, determining the centroid for a cell list can further include applying a statistical function to the GL associated with each of the selected call records that includes the cell list.

In one or more embodiments, the signal detail data can include signal strength data of serving and neighbor cells, and signal timing data that characterize, respectively, strength and timing of the signals associated with communication by the UE when the corresponding call record was generated.

In one or more embodiments the method can further include receiving GL prediction request data that includes a cell list and signal detail data associated with a call record, fetching the centroid that is stored in association with the cell list, consulting the ML model, based on the ML model, classifying the GL prediction request data and the fetched centroid, predicting the geolocation in accordance with the classification, and responding to the query with a result of the GL prediction.

In one or more embodiments, the method can further include interpolating the GL prediction based on the signal detail data.

In accordance with aspects of the disclosure, a computer system is provided that performs the disclosed method. In accordance with further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
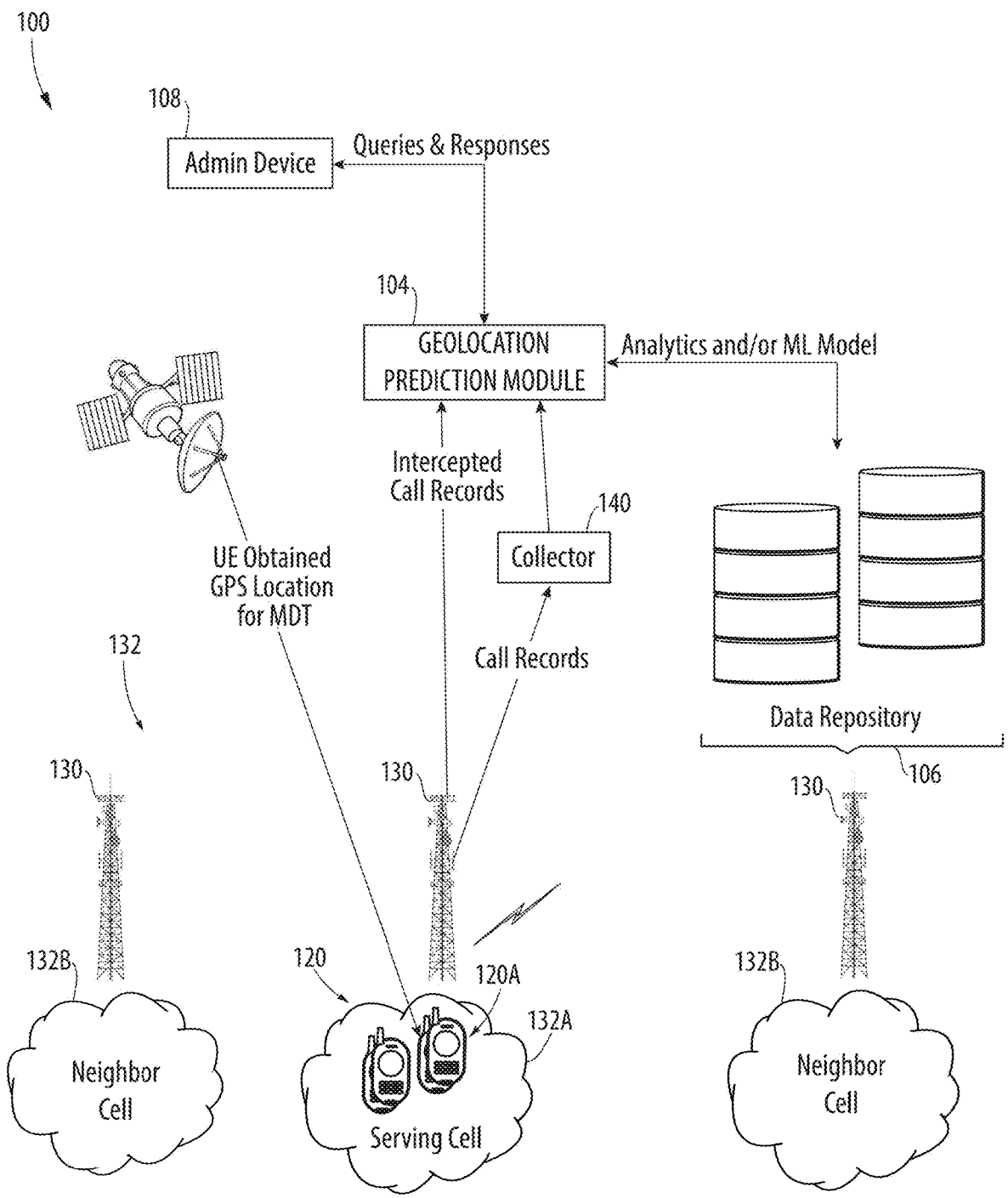
FIG. 1 illustrates a schematic flow diagram of an example geolocation prediction system for estimating or predicting geolocation of a UE in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a cellular communication system in accordance with the disclosure is shown in FIG. 1 and is designated generally by reference character 100. Other embodiments of the geolocation prediction of UEs using the cellular communication system in accordance with the disclosure, or aspects thereof, are provided in FIGS. 2-8 as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, a block diagram of an exemplary geolocation prediction system 104 included in, or in operative communication with cellular communication 100 is generally shown. The geolocation prediction system 100 illustrates an example of a high level overview of an implementation of an embodiment of the disclosure. Geolocation prediction system 104, which estimates a geolocation (without use of a machine learning (ML)) or predicts a geolocation (using ML) of one or more user equipment (UE) 120 (referred to individually and collectively as UE 120) communicating via one or more radio access networks (RANs) 130. Geolocation prediction module 104 includes or is in operative communication with a, data repository 106 and, optionally, a collector 140.

Geolocation prediction module 104 uses truth data obtained from a percentage of UEs 120 as training data for using ML to predict geolocation (GL) of a UE 120 that does not provide truth data. The truth data can include known location data, such as GPS location data (meaning GPS data or geolocation data determined based on GPS data).

Cellular communication network 100 is configured for facilitation of cellular communication, such as 3G, 4G, or 5G. Cellular communication network 100, includes a number of RANs 130, each having a cell tower with one or more antennae for receiving and sending signals, thus providing radio coverage for a cell 132. Each of cells 132 can overlap with one or more other cells 132.

Geolocation prediction module 104 includes one or more processing devices that are configured to receive copies of call records associated with call sessions during which a UE 120 communicates via one of RANs 130. The call records can be intercepted from signals propagated to RANs 130 and/or intentionally provided to geolocation prediction module 104 or collector 140 of a carrier data center (or service provider) with which geolocation prediction module 104 is affiliated.

A portion of UEs 120 that opted in to communication of truth data to collector 140 (e.g., via drive tests or MDT) are shown as participating UEs 120A. Call records from participating UEs 120A are provided intentionally to collector 140 with truth data.

Geolocation prediction module 104 can be configured as a server, and access geo location data through an application displayed on a desk top, a mobile device, etc. In addition, geolocation prediction module 104 can include or communicate with one or more probes that intercept the call sessions, such as fetch or be fed data from the probe(s). Geolocation prediction module 104 can be affiliated with a carrier data center (meaning included within or having a contractual agreement for sharing data) and receive call records via a collector 140 of the carrier data center. The carrier data center and its collector 140 can be affiliated with a particular carrier service provider or can be neutral, meaning the carrier data center is not affiliated with a particular carrier service provider, but can rather operate with multiple carrier service providers. Carrier data centers can be regulated, depending on the governing jurisdiction, to allow access to control plane data only. Carrier data centers cannot access user plane data in which geolocation information is available. Geolocation information is not available in control plane data.

Collector 140 receives call records or GPS location data from call records to collector 140 from participating UEs 120A that have opted into drive test or MDT participation. A participating UE 120A can participate in MDT when, for example, this feature is enabled by a user of the participating UE 120A. Many UEs 120 are provided with an option to enable MDT via carrier data centers or service providers, however typically only a portion of UEs 120 opt in Estimation of geolocation of a UE 120 using statistical calculations performed on only control plane data (e.g., Reference Signal Received Power (RSRP), Reference Signal Received Quality (RSRQ), Timing Advance (TA)) and any other measurement data consumes a large amount of resources, such as processing, memory and time resources.

Further complicating determination of geolocation is a transition from use of 3G technology to 4G or 5G technology. 3G technology allows an approximation of geolocation using triangulation based on connection to multiple cells. However, for purposes of conserving power, 4G and 5G technology only connects to a server cell. Power signals from only one tower signal 134 are available, foiling the ability to triangulate using power signals from three or more satellite towers.

Geolocation prediction module 104 is further configured to access data repository 106. Data repository 106 can be included within or external to geolocation prediction module 104. Data repository 106 can be a database, filing system, or other storage means for storing data. Data received by geolocation prediction module 104 can be stored in data repository 106 temporarily or permanently, as well as results of analysis of the data, which can include data structures or models based on results of the analysis.

Geolocation prediction module 104 can also gather data from call records of UEs 120 that did not opt in to provide truth data. These call records can, for example, be intercepted by geolocation prediction module 104 or can be provided to geolocation prediction module 104, e.g., by a carrier data center.

When a UE 120 is participating in a call via RAN 130, a server cell 132A handles exchange of call records having control plane and user plane messages for facilitating the call. One or more neighbor cells 132B can overlap with the server cell 132A. The server cell 132A and neighbor cells 132B can change during the call session, such as due to movement of the UE 120.

A call session can include, for example, a two-way or three-or-more-way (e.g., conference) call with audio and/or video, data, transmission of messages (e.g., short message service (SMS), email, chat, etc.), and/or transmission of graphics, text, audio and/or video files, internet protocol (IP) requests/replies, etc.

Each UE 120 is a cellular device that communicates with one or more other UEs via one or more RANs 130. The UE 120 can be a mobile communication device, such as cellular phone, smart phone, tablet, or a 5G capable sensor, instrument, etc. The UE 120 can include a global positioning satellite (GPS) receiver for communicating with global positioning satellites and trilaterating its location based on geolocation data received from at least three global positioning satellites.

Another example of participating UEs 120A that opted in to communicate truth data includes participating UEs 120A that perform drive tests by being transported through a geographic vicinity and voluntarily share geolocation data (such as GPS location data, triangulation of power signals, or other available sources) with collector 140 as the participating UEs 120A are transported.

An administration device 108 included with or external to geolocation predictor system 100 can be configured to access geolocation prediction module 104, such as to query the geolocation prediction module 104 for a geolocation of an identified UE 120. The administration device 108 can be affiliated or unaffiliated with a carrier data center or service provider that enables or uses the RAN 130. Geolocation prediction module 104 can respond to the queries with a prediction of the requested geolocation. A query can include a call record output by a serving cell while handling a UE's communication or data extracted from the call record, wherein the call record does not include truth data. The query requests a response with a prediction of the GL of the UE.

Geolocation prediction module 104 uses a trained ML model to respond to queries. The query can include a cell list and signal detail data. The cell list identifies the server cell as well as neighbor cells, wherein the neighbor cells are listed in order based on characteristics of signals transmitted by the neighbor cells. Each cell has a unique identifier used by the cellular communication network 100, such as a cell global identity (CGI) or a physical cell identity (PCI). The signal detail data can include, for example, signal strength data and signal timing data that characterize, respectively, strength and timing of the signals associated with communication by the UE when the corresponding call record was generated. The signal detail data can include, for example and without limitation, RSRP, RSRQ and/or TA.

Before responding to queries, the GL prediction module 104 prepares to train the ML model. Preparation for training the ML model includes receiving call records that may or may not include truth data, and further include signal detail data, selecting call records that include truth data, and storing the selected call records in repository 106. Once sufficient call records with truth data are stored, the signal detail data and truth data, and optionally the cell lists, of the stored selected all records are combined and provide as intermediate output that can be used for building the ML model. In addition, the cell list is stored paired with the centroid as a cell list to centroid mapping. The ML model is built using the intermediate output and by applying an ML algorithm, such as Random Forest, Linear regression, Lasso, neural algorithms, or any other ML algorithms.

Figure 2:
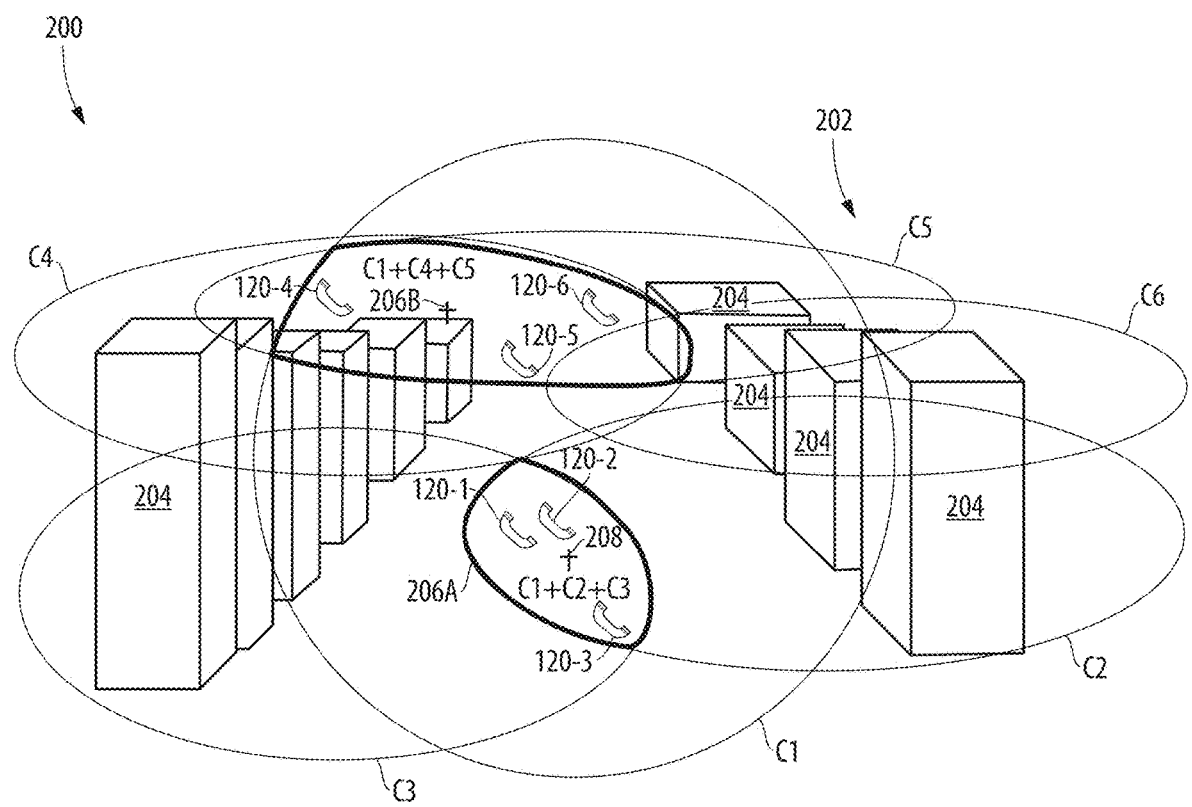
FIG. 2 illustrates a schematic diagram of an example geographic area, example coverage by a radio access network (RAN) and example user equipment (UE) disposed in the geographic area, in accordance with an illustrative embodiment of the present disclosure.

With additional reference to FIG. 2, a geographic area 200 is shown that is covered by a RAN 130. Several cells 202 are provided by RAN 130, shown individually as cells 202A, 202B, 202C, and 202D, each cell 202 having an associated cell tower 134. The geographic area 200 can have multiple structures 204. Structures 204 can be buildings, trees, bridges, mounds, etc., and can affect characteristics of signals transmitted to or from each cell 202, including signal strength, direction, attenuation, refraction, reflection, etc. In a dense urban area, there can be many structures 204 that are closely spaced. In order to compensate for the effect on signals by structures 204, RAN 130 can provide many cells 202 having towers 134 directed at different angles from one another to provide complete coverage within the geographic area 200.

Cells 202 can overlap with one another at common areas. Some common areas include portions of multiple cells 202. In dense urban areas, the number of cells 202 overlapping a common area can be numerous compared to a less dense area. When disposed in a common area, a UE 120 is aware of the cells 202 that are overlapping the common area. One of the overlapping cells 202 is a server cell that provides service to UE 120. Other cells 202 overlapping the common area are referred to as neighbor cells, and transmit signals that UE 120 senses. UE 120 can sort the neighbor cells into an order based on a signal quality, such as signal strength. At periodic intervals, UE 120 reports various measurement information to the server cell, including the order of the neighbor cells, referred to as a cell list, such as by incorporating the cell list into call records. Server cells and neighbor cells can be identified by unique identifiers used by RAN 130, such as cell global identity (CGI) or physical cell identity (PCI).

Each common area has a different cell list. Example common areas 206A and 206B are shown with respective cell lists and illustrated with bold outlines. The cell list for common area 206A is C1, C2, C3, meaning C1 is the server cell and C2 and C3 are neighbor cells ordered based on signal strength. A centroid 208 is shown in common area 206A that corresponds to an average of geolocations of UEs 120-1, 120-2, and 120-3 as reported while located in area 206A. The cell list for common area 206B is C1, C4, C5, meaning C1 is the server cell and C4 and C5 are neighbor cells ordered based on signal strength. A centroid 208 is shown in common area 206B that corresponds to an average of geolocations of UEs 120-4, 120-5, and 120-6 as reported while located in area 206B.

As a UE 120 is transported and moved from one common area to another common area, its cell list changes. The UE 120's cell list changes even if the UE 120 is continued to be served by the same server cell and its communication via RAN 130 has not been effected by a handover.

During a learning phase, reports for UEs 120A that opted in are provided to geolocation prediction module 104, each report including geolocation data for the UE 120A's location and a cell list that corresponds to the location. The reports are provided periodically and/or in response to a trigger, such as an event (e.g., start or handover of a call session). The reports can be included in call records that are provided to geolocation prediction module 104, e.g., via collector 140, or are intercepted by geolocation prediction module 104. The reports can also include additional data, such as RSRP, RSRQ, TA, etc., or equivalents. These reports are stored, e.g., in data repository 106.

Geolocation prediction module 104 can gather the reports. For each common area, a calculation, e.g., an average, mean, median, trimmed mean, trimmed median, etc., is performed to the geolocation data gathered that is associated with the cell list for the common area. The result of the calculation is referred to as a centroid 208. The centroid 208 is stored, e.g., in data repository 106, in association with the cell list 208.

The relationship between centroids 208 and cell lists can be stored in a data structure, such as a lookup table (LUT) and/or in a machine learning (ML) model, such as a feature column within the ML model. The ML model can be trained with supervised learning, wherein the learned item is the truth data. The training can use for example Random Forest, Bayesian Ridge Linear Regression, Lasso, neural networks or any other ML algorithms. The LUT (or equivalent data structure) and/or ML model can be updated over time with fresh truth data from participating UEs 120A. In this way, as common areas change, e.g., due to changes in structures 204 or cell towers 134, the association between cell lists and truth data is updated for maintaining and/or improving accuracy. Furthermore, accuracy can increase with an increase of cells 202 within a fixed geographic area 200, such as in dense urban areas.

The ML model can be used to discover relationships between cell lists and other parameters, such as (without limitation) RSRP, RSRQ and TA values and can learn to use these relationships to associate combinations of RSRP, RSRQ and/or TA, etc. values to a cell list and/or to a centroid 208 for the cell list for predicting geolocation of a UE 120 based on available parameters that include cell lists, RSRPs, RSRQs, and/or TAs, etc.

In one or more embodiments, the ML model can be a second stage ML model, such as taught by Patent Application Serial Nos. 17401059 and 17401070, having the same assignee as this patent application, which is incorporated herein by reference in its entirety.

FIGS. 3-7 show exemplary and non-limiting flow diagrams illustrating example methods in accordance with certain illustrated embodiments. The methods can be performed by a computing device, such as geolocation prediction module 104 shown in FIG. 1. Before turning to the description of FIGS. 3-7, it is noted that the flow diagrams show examples in which operational blocks are carried out in a particular order, as indicated by the lines connecting the blocks, but the various blocks shown in these flow diagrams can be performed in a different order, or in a different combination or sub-combination. It should be appreciated that in some embodiments some of the blocks described below may be combined into a single block or executed in parallel relative to one another. In some embodiments, one or more additional blocks may be included. In some embodiments, one or more of the blocks can be omitted.

Figure 3:
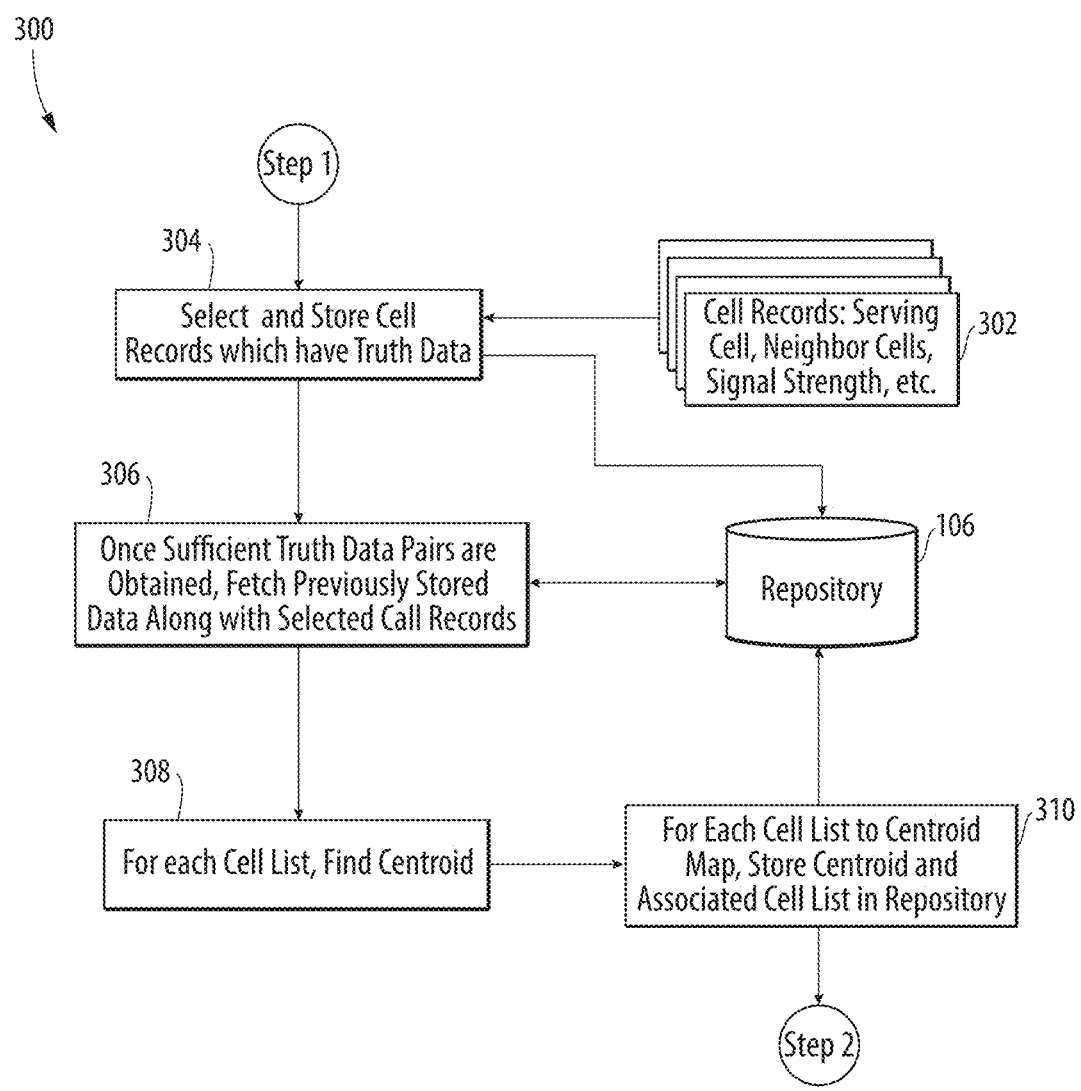
FIG. 3 shows a flow diagram that illustrates an example method for a learning process for associating a centroid with a cell list, in accordance with an illustrative embodiment of the present disclosure.

With reference to FIG. 3, a flow diagram 300 is shown that illustrates a method for a learning process for associating a centroid with a cell list. This learning process can be performed without using machine learning by a geolocation prediction module, such as geolocation prediction module 104 shown in FIG. 1.

At block 302, call records associated with one or more call sessions are received. The call records include a cell list that identifies a server cell and neighbor cells at the time the call record was generated. The call record further includes data about signal characteristics, such as signal strength and timing information, e.g., RSRP, RSRQ, TA, etc. The term "receive" is intended to be interpreted broadly when used in this sense, and can include receiving or intercepting a transmission, accessing data, reading data, or otherwise obtaining data.

The call records received do not include user plane data and are limited to control plane data. The call records can be sent to or from a UE, such as UEs 120 or 120A shown in FIG. 1. Some of the call records can include truth data that was sent from participating UEs, such as UEs 120A shown in FIG. 1. Other call records do not include truth data. The truth data includes measured geolocation (GL) data defining a GL associated with the call record, e.g., at which the call record was generated.

At block 304, those call records that include truth data are selected. Truth data from the selected call records is stored in association with the cell list included in the selected call records. The truth data and cell list associations can be stored as truth data pairs in repository 106. At block 306, once enough truth data pairs are stored, truth data pairs are fetched. Block 306 can be performed for truth data pairs per cell list or for truth data pairs for all selected call records.

At block 308, the truth data of the truth data pairs for per cell list are processed to determine a centroid for that cell list. Block 308 can be performed for truth data pairs associated with one cell list at a time, or for all truth data pairs stored. The centroid can be calculated as a statistical function of the truth data included in the truth data pairs for the cell list. Examples of statistical functions include average, mean, median, trimmed mean, trimmed median, etc.

At block 310, the centroid is stored in association with the corresponding cell list in a cell list to centroid mapping as a cell list/centroid pair. The cell list/centroid pair can be stored in repository 106. Blocks 306, 308, and 310 can be performed for each cell list once sufficient truth data pairs are obtained for that cell list or for processing the truth data for all of the selected call records. This results in repository 106 including a cell list/centroid pair for each cell list for which sufficient truth data was obtained.

The cell list to centroid mapping can be updated as the environment and/or location of cells and areas that correspond to cell lists change. Call records with truth data that reflects the changes to the environment and/or cell locations are processed and used to update the cell list to centroid mapping.

Figure 4:
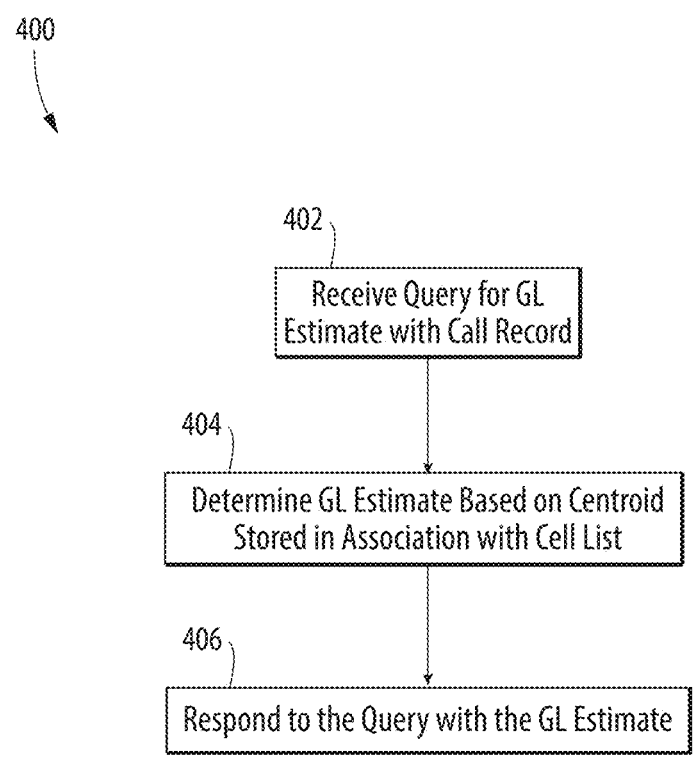
FIG. 4 shows a flow diagram that illustrates an example method for responding to a query for prediction of a geolocation of a UE, in accordance with an illustrative embodiment of the present disclosure.

With reference to FIG. 4, a flow diagram 400 is shown that illustrates a method for responding to a query for prediction of a geolocation of a UE, such as UE 120 shown in FIG. 1. The query can be based on call records sent to or from the UE. The call records include control plane information, but do not include truth data. Receipt and response to queries can be performed by a geolocation prediction module, such as geolocation prediction module 104 shown in FIG. 1.

At block 402, a query is received. The query can be received from a processing device, such as administrative device 108 or as part of the intercepted call records from RAN 130 that do not have truth data as shown in FIG. 1. The processing device can be affiliated with carrier data center or service provider that enables or uses a RAN, such as RAN 130, shown in FIG. 1. The query identifies a cell list, wherein the cell list identifies a server cell for a UE call session at the time a call record was generated and an ordered set of neighbor cells at the time a call record was generated, wherein the neighbor cells are ordered based on a characteristic of signals from the neighbor cells.

At block 404, an estimate of a geolocation is determined based on a centroid stored in association with the cell list, such as centroid 208 shown in FIG. 2. The centroid can be stored in association with the cell list in a repository, such as repository 106, shown in FIG. 1. At block 406, a response to the query is output, wherein the response includes a GL estimate that is based on the centroid.

Figure 5:
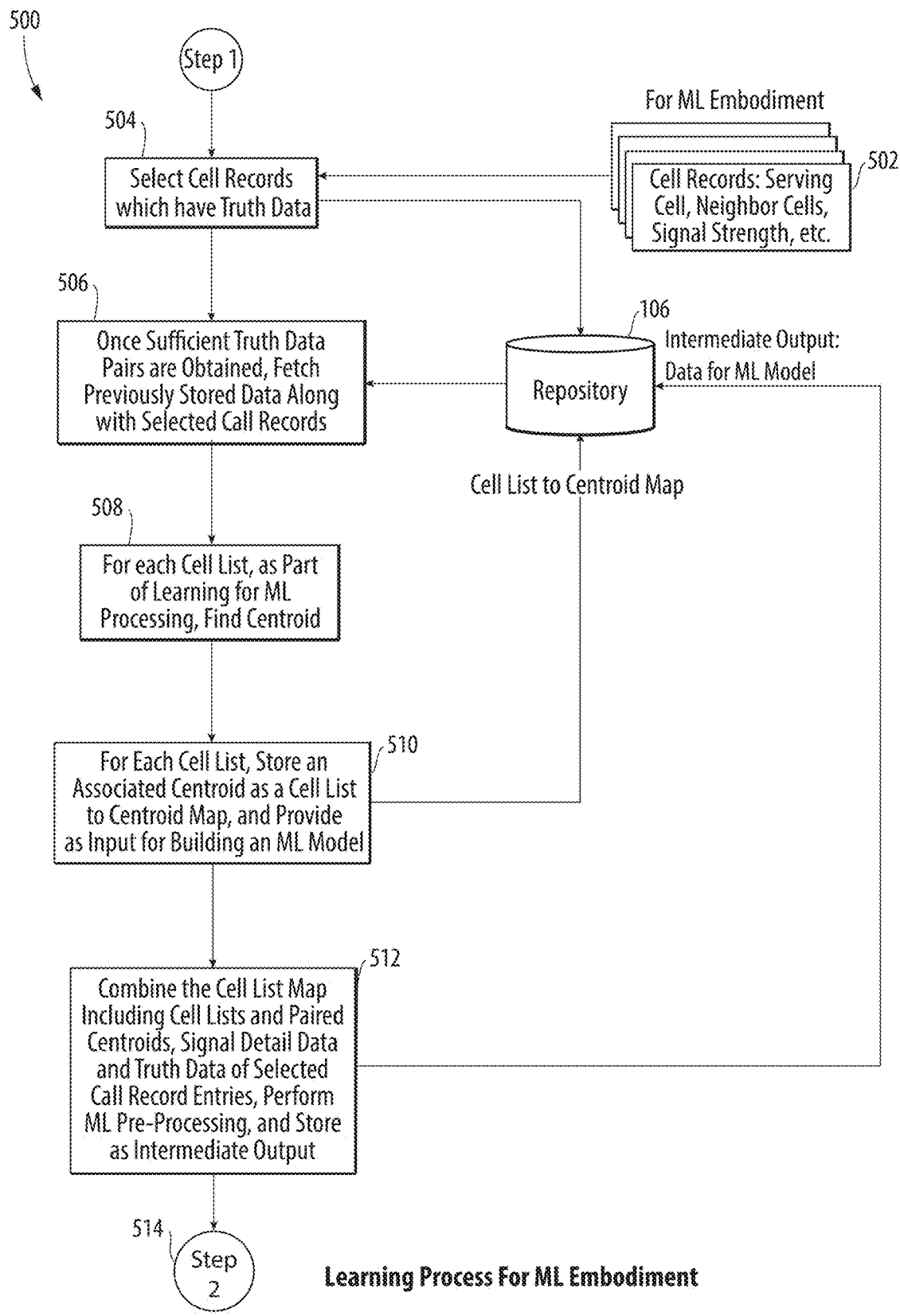
FIG. 5 shows a flow diagram that illustrates an example method for a learning process in preparation of building an example machine learning (ML) model that uses cell lists, pairing of centroids, signal detail data, and truth data, in accordance with an illustrative embodiment of the present disclosure.

With reference to FIG. 5, a flow diagram 500 is shown that illustrates a method for a first step that includes a learning process in preparation of building an ML model that uses cell lists, the pairing of centroids and cell lists, signal detail data, and truth data. This learning process can use machine learning and be performed by a geolocation prediction module, such as geolocation prediction module 104 shown in FIG. 1. In addition, the learning process can continue to be used for updating the ML model after it is built.

At block 502, call records associated with one or more call sessions are received, wherein some of the call records can include truth data that was sent from participating UEs, such as UEs 120A shown in FIG. 1. Other call records do not include truth data.

At block 504, those call records that include truth data are selected. Truth data from the selected call records is stored in association with the cell list included in the selected call records. The truth data and cell list associations can be stored as truth data pairs in repository 106. At block 506, once enough truth data pairs are stored, truth data pairs are fetched. Block 506 can be performed for truth data pairs per cell list for all selected call records.

At block 508, as part of an initial or ongoing learning process prior to or while using ML to predict GL, the truth data of the truth data pairs per cell list are processed to determine a centroid for that cell list. Block 508 can be performed for truth data pairs associated with one cell list at a time, or for all truth data pairs stored.

At block 510, for each cell list, store cell list/centroid pair in a cell list to centroid mapping in the repository. In addition, for each cell, the cell list/centroid pair can be provided as input in preparation of building an ML model.

At block 512, combine the cell list to centroid mapping including cell lists and paired centroids with additional information in the selected call records, including signal detail data and truth data included in the selected call records. ML pre-processing is performed on the combined data and stored as intermediate output that will be used to build the ML model. The signal detail data can include, for example, signal strength data and signal timing data that characterize, respectively, strength and timing of the signals associated with communication by the UE when the corresponding call record was generated. The signal detail data can include, for example and without limitation, RSRP(s), RSRQ(s), GL centroid and TA.

Figure 6:
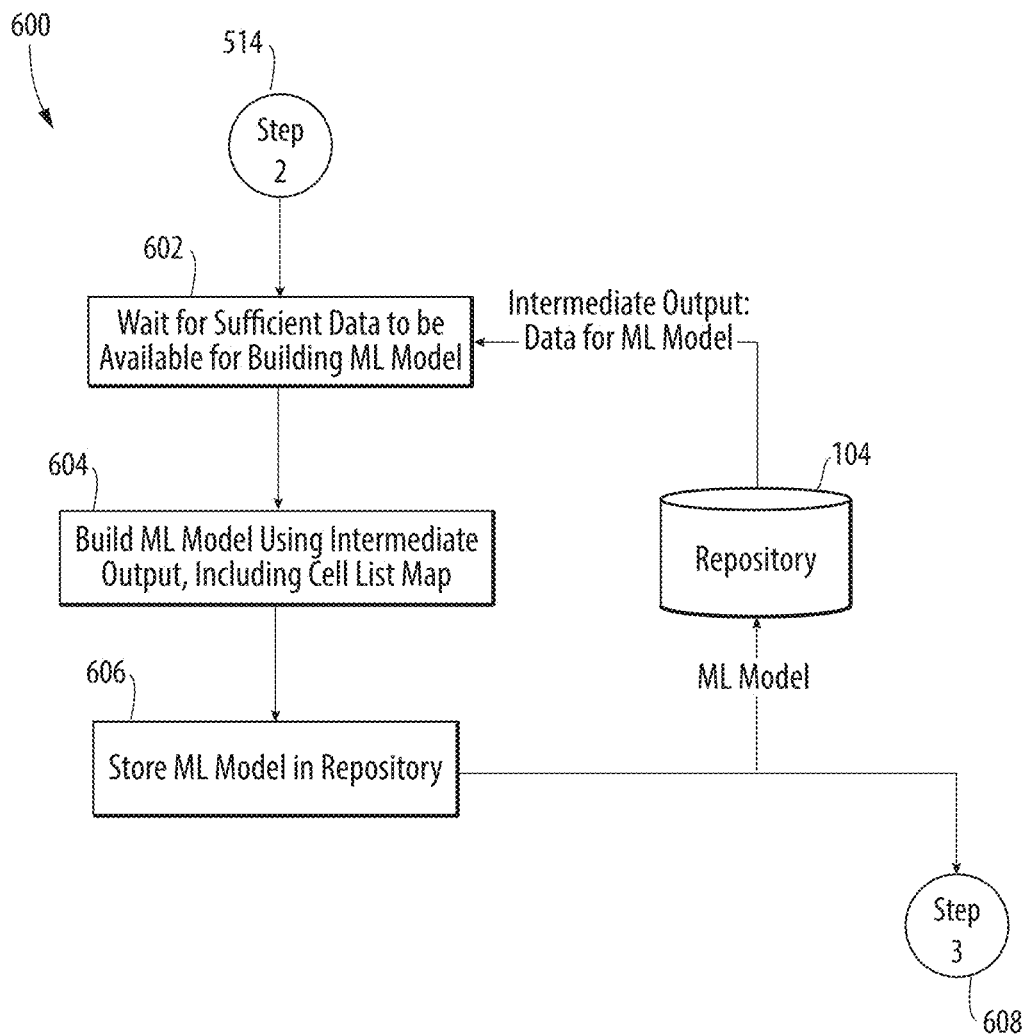
FIG. 6 shows a flow diagram that illustrates an example method for building the ML model prepared in FIG. 5, in accordance with an illustrative embodiment of the disclosure.

The method can continue at block 514 (labeled Step 2), which is expanded in flowchart 600 of FIG. 6, for building the ML model. An ML algorithm for supervised learning, such as random forest, Bayesian Ridge Linear Regression, Lasso, neural networks or any other ML algorithms can be used when training the ML model.

The ML model can continue to learn and change as the environment and/or location of cells and areas that correspond to cell lists change. Call records with truth data that reflects the changes to the environment and/or cell locations are processed and used to update the cell list/centroid pairs in the cell list to centroid mapping, which is then used to update the intermediate output that will be used to build the ML model.

With reference to FIG. 6, a flow diagram 600 is shown that illustrates a method for building an ML model. Continuing from block 514, at block 602, a determination is made whether sufficient data (e.g., the intermediate output) is available in the repository to build an ML model. The method advances to block 604 once sufficient data is available. At block 604, the ML model is built using supervised learning and the intermediate output, including signal strength data, signal timing data, cell list/centroid pairs, truth data, etc. The cell list, which is already part of the cell data, along with a centroid that was obtained from a cell list/ centroid pair is used as part of feature columns in the ML model.

During the learning phase shown in FIG. 5, truth data may be available for the different cell lists that has associated, respective signal detail data. When building the ML model, it is based on the selected call records, and more particularly based on the cell list, signal detail data, and truth data associated with the respective selected call records.

For example, the call records with truth data having a GL included in a geographical area covered by a single cell list is included in a group. A centroid is determined for the group based on the group's truth data, and the centroid is paired with the corresponding cell list. The ML model, which could be based on a serving cell, could have many such groups that each correspond to a different respective cell list. For a ML model based on a particular serving cell, each cell list and its corresponding centroid (obtained from the pairing of the cell list with its corresponding centroid), along with signal detail data from call records that include the cell list are all inputs to the ML model and are all used to train the model. For a ML model that is based on a particular cell list, the signal detail data from call records that include the particular cell list is the input to the ML model and is used to train the model.

For example, a statistical function can be applied to the truth data of the call records in a group associated with a single cell list can be used to determine a centroid. Examples of statistical functions include average, mean, median, trimmed mean, trimmed median, etc.

At block 606, the ML model is stored in the repository. The method can continue at block 608 (labeled Step 3), which is expanded in flowchart 700 of FIG. 7, for performing a prediction process.

The ML model can be updated, e.g., periodically or in response to an event or condition, such as when there are changes to the intermediate output. The updated intermediate output used to update the ML model.

Figure 7:
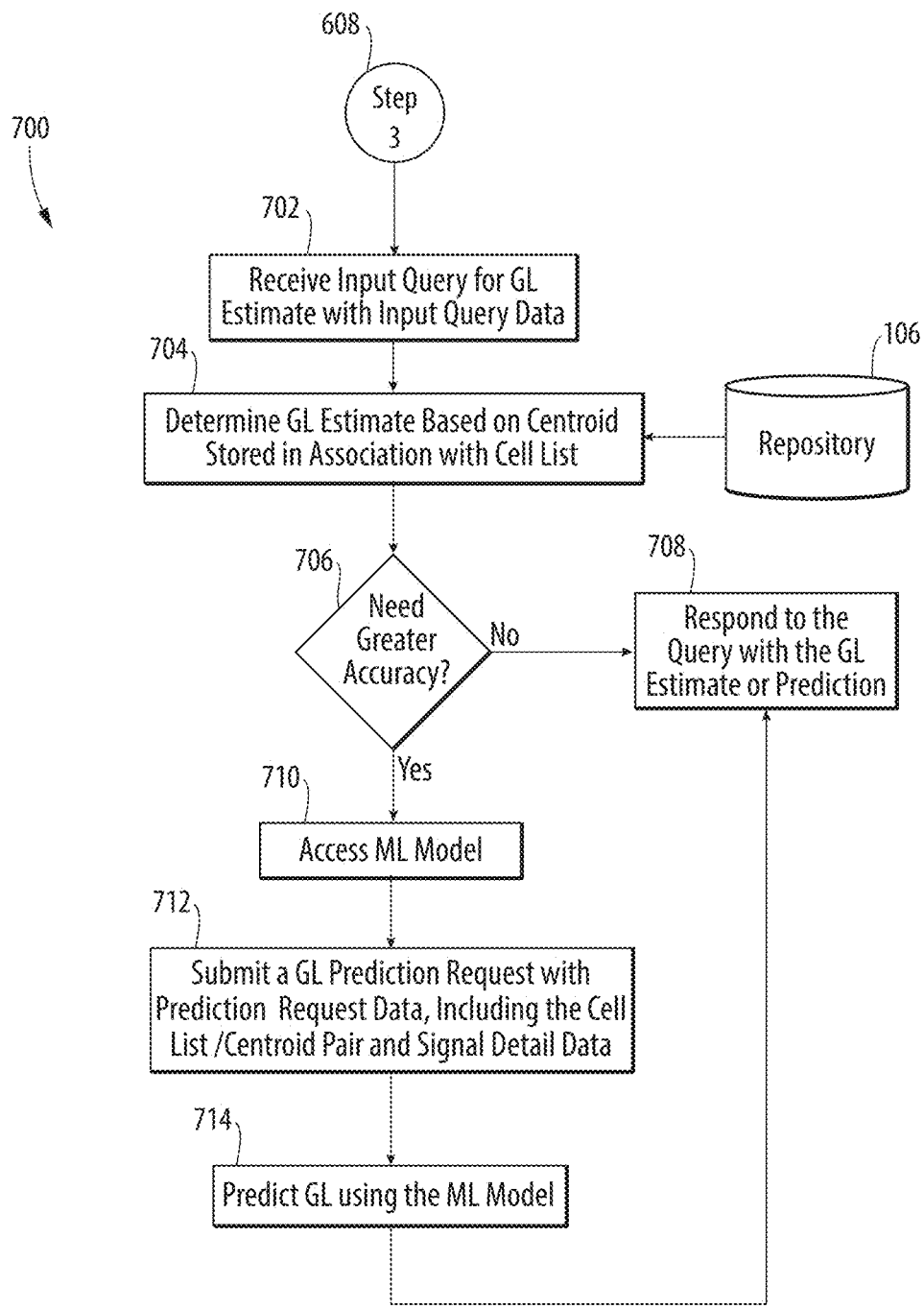
FIG. 7 shows a flow diagram that illustrates an example method for responding to a query for predicting a geolocation of a UE using the ML model, in accordance with an illustrative embodiment of the present disclosure.

With reference to FIG. 7, a flow diagram 700 is shown that illustrates a method for responding to a query for predicting a GL of a UE using the ML model. The query can be based on call records sent to or from the UE. This prediction process can use machine learning and be performed by a geolocation prediction module, such as geolocation prediction module 104 shown in FIG. 1.

Continuing from block 608, at block 702, a query having input query data is received for a GL estimate of a UE based on a call record. The input query data can include the call record or the cell list and possibly detailed signal data, e.g., from a call record. The call record can be selected for the query from multiple call records. At block 704, the repository is consulted to determine the centroid that is mapped to the cell list as a cell list/centroid pair in the stored cell list to centroid mapping. A GL estimate can be ascertained based on the centroid determined.

At decision block 706, a determination is made whether greater accuracy is needed or desired. If the determination at block 706 is that greater accuracy is not needed or desired, or when ML is not used or available, the method ends at block 708 by responding to the query with the centroid GL as the GL estimate for the UE. If the determination at block 706 is that greater accuracy is needed or desired, the method continues at block 710.

At block 710, the ML model is accessed. At block 712, a GL prediction request having prediction request data is submitted to the ML model. The prediction request data includes the cell list and the detailed signal data, e.g., from the input query data, and further includes the centroid that was paired with the cell list. Since the ML model was developed using supervised learning and an ML algorithm (such as random forest) the prediction request data, including the centroid paired with the corresponding cell list, can be classified based on the ML model and using ML. At block 714, GL is predicted based on the classification.

In one or more embodiments, the GL prediction module 104 can be configured to provide GL estimation by using by pairing of the centroid with the cell list, which leverages truth data, but does not leverage signal detail data or use ML. For example, when the cell list in query input data corresponds to a small geographic area, accuracy of a GL estimation based on fetching the centroid that is stored in association with the cell list may be deemed sufficient.

In one or more embodiments, the GL prediction module 104 can be configured to provide GL predictions by using ML, pairing of the centroid with the cell list, and further leveraging signal detail data. For example, when the cell list in query input data corresponds to a large geographic area, accuracy of a GL estimation based on fetching the centroid that is stored in association with the cell list may be deemed insufficient, and greater accuracy may be desired.

In one or more embodiments, only one of the lower or higher level of accuracy is available, whereas in other embodiments, both levels of accuracy are available and the desired level of accuracy can be selected. Aspects of the present disclosure are described above with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Figure 8:
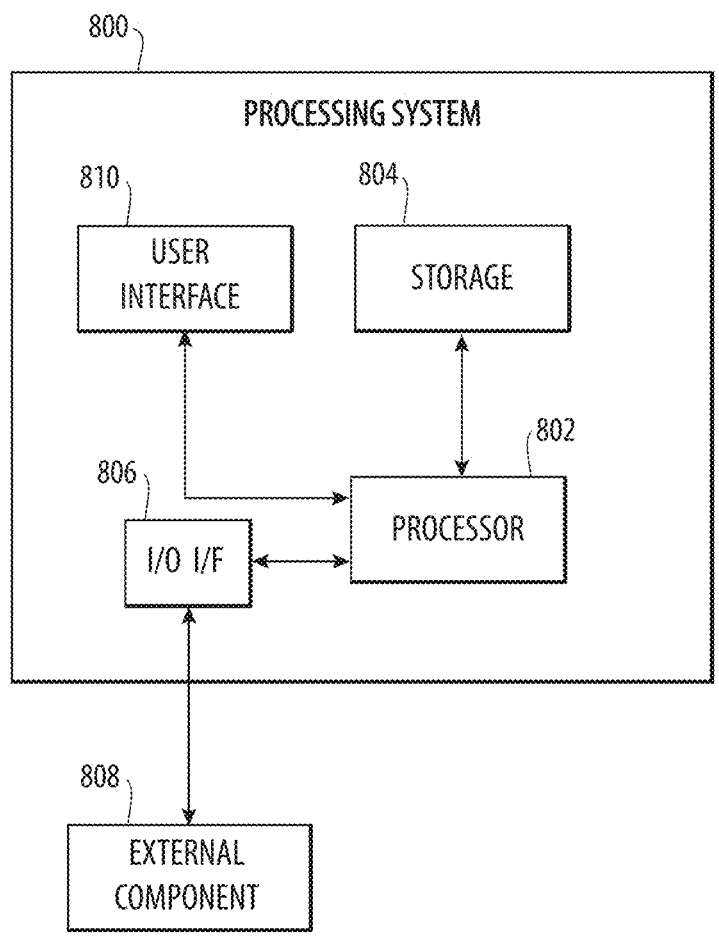
FIG. 8 illustrates a schematic block diagram of an example computer system used by the geolocation prediction system of FIG. 1 for performing the disclosed methods, in accordance with an illustrative embodiment of the present disclosure.

With reference to FIG. 8, a block diagram of an example processing system 800 is shown, which provides an example configuration of a geolocation prediction module 104 embodied in one or more computer systems. One such computer system 800 is illustrated in FIG. 8. In various embodiments, computer system 800 may be a server, a mainframe computer system, a workstation, a network computer, a desktop computer, a laptop, a handheld computer, or the like, and/or include one or more of a field-programmable gate array (FPGA), application specific integrated circuit (ASIC), microcontroller, microprocessor, or the like. Processing system 800 is only one example of a suitable system and is not intended to suggest any limitation as to the scope of use or functionality of embodiments of the disclosure described herein. Processing system 800 can be implemented using hardware, software, and/or firmware. Regardless, processing system 800 is capable of being implemented and/or performing functionality as set forth in the disclosure.

Processing system 800 is shown in the form of a general-purpose computing device. Processing system 800 includes a processing device 802, memory 804, an input/output (I/O) interface (I/F) 806 that can communicate with an internal component, such as a user interface 810, and optionally an external component 808, such as a processing device that submits queries to geolocation prediction module 104 and receives returned responses to the queries.

The processing device 802 can include, for example, a programmable logic device (PLD), microprocessor, DSP, a microcontroller, an FPGA, an ASIC, and/or other discrete or integrated logic circuitry having similar processing capabilities.

The processing device 802 and the memory 804 can be included in components provided in the FPGA, ASIC, microcontroller, or microprocessor, for example. Memory 804 can include, for example, volatile and non-volatile memory for storing data temporarily or long term, and for storing programmable instructions executable by the processing device 802. Memory 804 can be a removable (e.g., portable) memory for storage of program instructions. I/O I/F 806 can include an interface and/or conductors to couple to the one or more internal components, such as user interface 810 and/or external components 808.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of geolocation prediction module 104 may be implemented or executed by one or more computer systems, such as a microprocessor. Each computer system 800 can be included within geolocation prediction module 104, or multiple instances thereof. In various embodiments, computer system 800 may include one or more of a microprocessor, an FPGA, application specific integrated circuit (ASIC), microcontroller. The computer system 800 can be provided as an embedded device. Portions of the computer system 800 can be provided externally, such by way of a virtual, centralized, and/or cloud-based computer.

Computer system 800 is only one example of a suitable system and is not intended to suggest any limitation as to the scope of use or functionality of embodiments of the disclosure described herein. Regardless, computer system 800 is capable of being implemented and/or performing any of the functionality set forth hereinabove.

Computer system 800 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled. The disclosed geolocation prediction system and method provide potential advantages of applying statistics to truth data, when a UE sending call records operates in a dense urban location that has many cells, large obstructions, a high population density, and a large number of handovers and relocation of UEs. The large number of handovers and relocation of UEs results in a large number of requests for GLs. This large number of unique cell lists are leveraged to determine cell list/centroid pairs. The increased number of cells in the dense urban area boosts accuracy of the GL predictions. The ability to further enhance accuracy by using ML and leveraging signal detail data provides increased versatility.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

I claim:

1. A method comprising:
receiving call records from a control plane in association with user equipment (UE) call sessions for communication by user equipment via a radio access network (RAN), each call record including a cell list, wherein the cell list identifies the server cell for the UE call session at the time the call record was generated and an ordered set of neighbor cells that are ordered based on a characteristic of signals from the neighbor cells;
selecting call records from the call records received that include truth data, wherein the truth data includes geolocation (GL) data reported to be a GL associated with the call record;
storing GL data of the selected call records in association with the cell list for the selected call records;
determining for each cell list, a centroid, wherein the centroid is calculated as a function of the GL data associated with each of the selected call records that includes the cell list; and
storing the centroid for each cell list in association with the cell list,
wherein the centroid is retrievable as a prediction for a GL based on submission of a cell list.

2. The method of claim 1, further comprising:
receiving a query for a GL prediction, wherein the query includes a cell list;
determining a GL prediction based on the centroid stored in association with the cell list; and
responding to the query with the GL prediction.

3. The method of claim 2, further comprising updating the GL data stored in association with the cell list over time based on newly selected call records selected from newly received call records that include truth data.

4. The method of claim 1, wherein the selected call records further include signal detail data reported to be a characteristic of signals associated with communication by the UE when the corresponding call record was generated, the method further comprising building a machine learning (ML) model based on the selected call records and the corresponding cell list, signal detail data, and truth data.

5. The method of claim 4, wherein building the ML model further comprises, for each cell list, further building the ML model based on the centroid associated with the cell list.

6. The method of claim 1, wherein determining the centroid for a cell list includes applying a statistical function to the GL associated with each of the selected call records that includes the cell list.

7. The method of claim 4, wherein the signal detail data include signal strength data of serving and neighbor cells, and signal timing data that characterize, respectively, strength and timing of the signals associated with communication by the UE when the corresponding call record was generated.

8. The method of claim 5, further comprising:
receiving GL prediction request data that includes a cell list and signal detail data associated with a call record;
fetching the centroid that is stored in association with the cell list;
consulting the ML model;

based on the ML model, classifying the GL prediction request data and the fetched centroid;

predicting the geolocation in accordance with the classification; and responding to the query with a result of the GL prediction.

9. The method of claim 5, further comprising interpolating the GL prediction based on the signal detail data.

10. A system comprising:

a memory configured to store instructions;

a processor disposed in communication with the memory, wherein the processor upon execution of the instructions is configured to:

receive call records from a control plane in association with user equipment (UE) call sessions for communication by user equipment via a radio access network (RAN), each call record including a cell list, wherein the cell list identifies the server cell for the UE call session at the time the call record was generated and an ordered set of neighbor cells that are ordered based on a characteristic of signals from the neighbor cells;

select call records from the call records received that include truth data, wherein the truth data includes geolocation (GL) data reported to be a GL associated with the call record;

store GL data of the selected call records in association with the cell list for the selected call records;

determine for each cell list, a centroid, wherein the centroid is calculated as a function of the GL data associated with each of the selected call records that includes the cell list; and storing the centroid for each cell list in association with the cell list, wherein the centroid is retrievable as a prediction for a GL based on submission of a cell list.

11. The system of claim 10, wherein the processor upon execution of the instructions is further configured to:

receive a query for a GL prediction, wherein the query includes a cell list;

determine a GL prediction based on the centroid stored in association with the cell list; and respond to the query with the GL prediction.

12. The system of claim 11, wherein the processor upon execution of the instructions is further configured to update the GL data stored in association with the cell list over time based on newly selected call records selected from newly received call records that include truth data.

13. The system of claim 10, wherein the selected call records further include signal detail data reported to be a characteristic of signals associated with communication by the UE when the corresponding call record was generated, and wherein the processor upon execution of the instructions is further configured to build a machine learning (ML) model based on the selected call records and the corresponding cell list, signal detail data, and truth data.

14. The system of claim 13, wherein building the ML model further comprises, for each cell list, further building the ML model based on the centroid associated with the cell list.

15. The method of claim 10, wherein determining the centroid for a cell list includes applying a statistical function to the GL associated with each of the selected call records that includes the cell list.

16. The method of claim 13, wherein the signal detail data include signal strength data of serving and neighbor cells, and signal timing data that characterize, respectively, strength and timing of the signals associated with communication by the UE when the corresponding call record was generated.

17. The method of claim 14, wherein the processor upon execution of the instructions is further configured to:

receive GL prediction request data that includes a cell list and signal detail data associated with a call record;

fetch the centroid that is stored in association with the cell list;

consult the ML model;

based on the ML model, classify the GL prediction request data and the fetched centroid;

predict the geolocation in accordance with the classification; and respond to the query with a result of the GL prediction.

18. A non-transitory computer readable storage medium and one or more computer programs embedded therein, the computer programs comprising instructions, which when executed by a computer system, cause the computer system to:

receive call records from a control plane in association with user equipment (UE) call sessions for communication by user equipment via a radio access network (RAN), each call record including a cell list, wherein the cell list identifies the server cell for the UE call session at the time the call record was generated and an ordered set of neighbor cells that are ordered based on a characteristic of signals from the neighbor cells;

select call records from the call records received that include truth data, wherein the truth data includes geolocation (GL) data reported to be a GL associated with the call record;

store GL data of the selected call records in association with the cell list for the selected call records;

determine for each cell list, a centroid, wherein the centroid is calculated as a function of the GL data associated with each of the selected call records that includes the cell list; and storing the centroid for each cell list in association with the cell list, wherein the centroid is retrievable as a prediction for a GL based on submission of a cell list.

19. The non-transitory computer readable storage medium of claim 18, wherein the selected call records further include signal detail data reported to be a characteristic of signals associated with communication by the UE when the corresponding call record was generated, wherein the computer programs, when executed by a computer system, further causes the computer system to build a machine learning (ML) model based on all, for each the selected call records and the corresponding cell list, signal detail data, and truth data associated.

20. The non-transitory computer readable storage medium of claim 19, wherein building the ML model further comprises, for each cell list, further building the ML model based on the centroid associated with the cell list.

* * * * *